United States Patent
Nitanai

(10) Patent No.: US 10,768,466 B2
(45) Date of Patent: Sep. 8, 2020

(54) DISPLAY DEVICE

(71) Applicant: Funai Electric Co., Ltd., Daito, Osaka (JP)

(72) Inventor: Naoki Nitanai, Osaka (JP)

(73) Assignee: FUNAI ELECTRIC CO., LTD., Osaka (JP)

(*) Notice: Subject to any disclaimer, the term of this patent is extended or adjusted under 35 U.S.C. 154(b) by 0 days.

(21) Appl. No.: 16/240,108

(22) Filed: Jan. 4, 2019

(65) Prior Publication Data

US 2019/0212609 A1     Jul. 11, 2019

Related U.S. Application Data

(63) Continuation of application No. 15/793,119, filed on Oct. 25, 2017, now Pat. No. 10,338,427.

(30) Foreign Application Priority Data

Oct. 27, 2016 (JP) .................. 2016-210638

(51) Int. Cl.
    *G02F 1/1335*      (2006.01)
    *G02F 1/13357*      (2006.01)
    *G02F 1/1333*      (2006.01)

(52) U.S. Cl.
CPC .. *G02F 1/133504* (2013.01); *G02F 1/133606* (2013.01); *G02F 1/133608* (2013.01);
(Continued)

(58) Field of Classification Search
CPC ... G02F 2001/133567; G02F 1/133524; G02F 1/133504; G02F 1/133606; G02F 1/133608
See application file for complete search history.

(56) References Cited

U.S. PATENT DOCUMENTS

2005/0151894 A1* 7/2005 Katsuda ............ G02F 1/133308
    349/58
2006/0007367 A1* 1/2006 Cho .................. G02F 1/133308
    349/58
(Continued)

FOREIGN PATENT DOCUMENTS

| CN | 201725864 A | 6/2010 |
|---|---|---|
| JP | 2007-155935 A | 6/2007 |
| JP | 2007-155940 A | 6/2007 |

OTHER PUBLICATIONS

Extended European Search Report of the corresponding European Application No. 17198773.8, dated Mar. 12, 2018.
(Continued)

*Primary Examiner* — Phu Vu
(74) *Attorney, Agent, or Firm* — Global IP Counselors, LLP

(57) ABSTRACT

A display device includes a light source, a display panel, an optical sheet laminate, a cabinet, and a frame. The light source emits light. The display panel displays image. The optical sheet laminate transmits the light directed to the display panel. The cabinet forms a housing of the display device, the cabinet having a front cabinet and a rear cabinet. The frame holds the optical sheet laminate, the frame having a front frame and a rear frame. The optical sheet laminate includes a first optical sheet having an opening near an edge of the first optical sheet, and at least one second optical sheet at least partially contacting with the first optical sheet and having an opening near an edge of the at least one second optical sheet. The front frame and the rear frame are attached to the front cabinet with a screw.

18 Claims, 10 Drawing Sheets

(52) U.S. Cl.
CPC .. *G02F 1/133603* (2013.01); *G02F 1/133605* (2013.01); *G02F 2001/13332* (2013.01); *G02F 2001/133317* (2013.01); *G02F 2001/133567* (2013.01); *G02F 2201/46* (2013.01); *G02F 2201/465* (2013.01); *G02F 2201/54* (2013.01)

(56) References Cited

U.S. PATENT DOCUMENTS

| | | |
|---|---|---|
| 2010/0103652 A1 | 4/2010 | Ito |
| 2014/0111735 A1 | 4/2014 | Cho et al. |
| 2015/0181732 A1* | 6/2015 | Fujikawa ................ H04N 5/64 361/679.01 |
| 2015/0208017 A1 | 7/2015 | Mori et al. |
| 2016/0116790 A1* | 4/2016 | Do .................... G02F 1/133308 349/58 |
| 2019/0121017 A1* | 4/2019 | Sugimoto ......... G02F 1/133608 |

OTHER PUBLICATIONS

The European search report of the European application No. 19153806.5, dated May 13, 2019.

* cited by examiner

DISPLAY DEVICE

CROSS-REFERENCE TO RELATED APPLICATIONS

This is a continuation application of U.S. patent application Ser. No. 15/793,119 filed on Oct. 25, 2017, which claims priority to Japanese Patent Application No. 2016-210638 filed on Oct. 27, 2016. The entire disclosures of U.S. patent application Ser. No. 15/793,119 and Japanese Patent Application No. 2016-210638 are hereby incorporated herein by reference.

BACKGROUND

Field of the Invention

The present invention generally relates to a display device.

Background Information

With a backlight module provided inside a liquid crystal display device, a plurality of optical sheets are stacked on a diffusing plate. In recent years there has been a tendency to reduce the thickness of optical sheets in order to lower the cost of the optical sheets. However, the basic materials and manufacturing methods of these optical sheets have not changed.

Japanese Patent Application Publication No. 2007-155940 (Patent Literature 1) discloses a display-use optical sheet in which three or more optical sheets are laminated. With this display-use optical sheet, of the stacked optical sheets, the edge of the uppermost optical sheet and the edge of the lowermost optical sheet are bonded by welding, an adhesive, or the like. This joining prevents occurrence of bending due to thermal expansion or thermal contraction of the optical sheets.

SUMMARY

However, when an optical sheet is made thinner, the decrease in rigidity makes it more likely that wrinkles will occur in the optical sheets when a plurality of optical sheets are stacked. In particular, with an optical sheet having a large surface area, rigidity tends to decrease and wrinkles are more apt to occur. Also, with an optical sheet that is under an environment of high humidity, the areas closer to the edges absorb moisture more readily than does the central portion. Also, unevenness in water absorption due to how readily moisture is absorbed and released is different on the surface and in the interior of the optical sheet, and may also vary with the side of the sheet (for example, the front and back sides). Therefore, with an optical sheet whose rigidity has been lowered by reducing its thickness, wrinkles are likely to occur due to uneven distribution of water absorption. This wrinkling lowers the quality of the display screen in the backlight module of a liquid crystal display device, for example.

With the display-use optical sheet in Patent Literature 1, the optical sheets in the intermediate layers are not joined to the optical sheets of the uppermost and lowermost layers. Therefore, it cannot be said that wrinkling of the optical sheets of the intermediate layers can be sufficiently prevented.

One object is to provide a display device with which the wrinkling of optical sheets is suppressed or prevented.

In view of the state of the known technology and in accordance with an aspect of the present invention, a display device includes a light source, a display panel, an optical sheet laminate, a cabinet, and a frame. The light source emits light. The display panel displays image. The optical sheet laminate transmits the light directed to the display panel. The cabinet forms a housing of the display device, the cabinet having a front cabinet and a rear cabinet. The frame holds the optical sheet laminate, the frame having a front frame and a rear frame. The optical sheet laminate includes a first optical sheet having an opening near an edge of the first optical sheet, and at least one second optical sheet at least partially contacting with the first optical sheet and having an opening near an edge of the at least one second optical sheet. The front frame and the rear frame are attached to the front cabinet with a screw.

BRIEF DESCRIPTION OF THE DRAWINGS

Referring now to the attached drawings which form a part of this original disclosure.

DETAILED DESCRIPTION OF EMBODIMENTS

Figure 1:
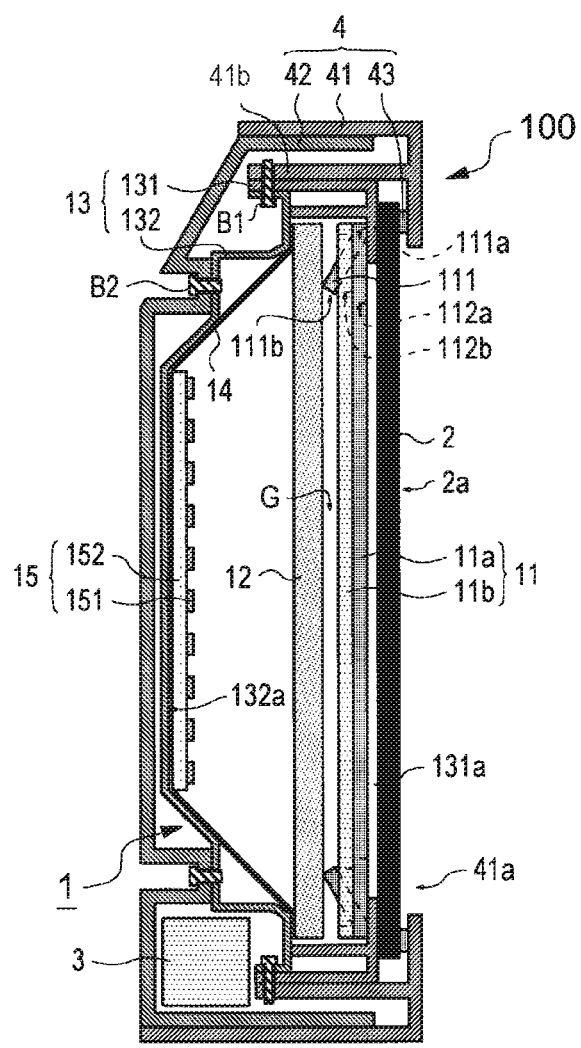
FIG. 1 is a cross sectional view of a configuration example of a display device pertaining to a first embodiment.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Selected embodiments will be described using a display device 100 as an example. In the following description, the side of the display device 100 on which an image is displayed is referred to as "front," and the opposite side as "rear." Also, the side facing front is referred to as the "front face," and the side facing rear is referred to as the "rear face." Also, in the optical sheets 11a and 11b (discussed below), a direction perpendicular to the front face 113 of the optical sheets 11a and 11b is referred to as the "X direction." The direction in which the unbent latching component 111 (discussed below) extends (out of the directions parallel to the front face 113) is referred to as the "Z direction," and the direction perpendicular to the X direction and the Z direction is referred to as the "Y direction." The X direction, the Y direction, and the Z direction are all perpendicular to each other.

First Embodiment

FIG. 1 is a cross sectional view of a configuration example of a display device 100 pertaining to a first embodiment.

The display device 100 has a direct backlight module 1, a liquid crystal display panel 2, a circuit unit 3, a cabinet 4, and a speaker (not shown).

The backlight module 1 is an illumination device disposed behind the liquid crystal display panel 2, and irradiates light for displaying a specific image at the liquid crystal display panel 2. The backlight module 1 will be described in detail below.

Figure 6:
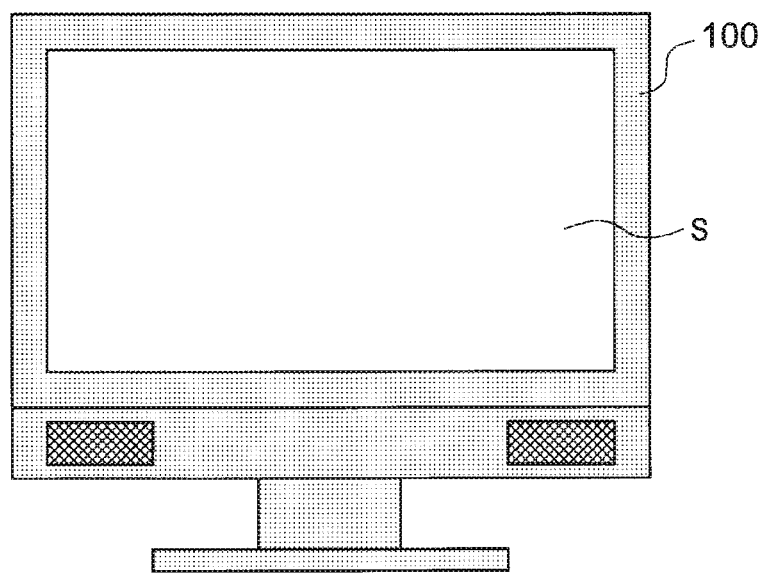
FIG. 6 is an example of the display screen when there are no wrinkles in the optical sheet laminate.

The liquid crystal display panel 2 is a display component that displays a specific image based on an image signal outputted from the circuit unit 3, and uses the light emitted from the backlight module 1 to display a specific image on a display screen S (see FIG. 6 (discussed below)). The liquid crystal display panel 2 includes, for example, a first polarizing plate, a glass substrate, a color filter, a liquid crystal layer, a second polarizing plate, a drive module, and the like (none of which is shown). Also, in the illustrated embodiment, the liquid crystal display panel 2 is an example of a display panel of the present application.

The circuit unit 3 (e.g., electric controller or circuit) controls the drive of the display device 100. The detailed configuration of the circuit unit 3 is relatively conventional, and thus will not be described in detail for the sake of brevity. The circuit unit 3 includes, for example, a power supply unit, an image display unit and an audio output unit of the display device 100. An image display unit displays an image on the liquid crystal display panel 2. A sound output unit outputs sound based on an audio signal outputted from the circuit unit 3, from a speaker, for example.

The cabinet 4 is the housing of the display device 100. The cabinet 4 is molded from a resin material, for example. The cabinet 4 houses the backlight module 1, the liquid crystal display panel 2, the circuit unit 3, a speaker, and the like. The cabinet 4 has a front cabinet 41, a rear cabinet 42, and a cushioning member 43.

The front cabinet 41 is a rectangular frame that covers the rear cabinet 42 and is disposed so as to surround the side peripheral edges of the backlight module 1 and the liquid crystal display panel 2. The front cabinet 41 has a window 41a on the inner side of the frame shape so that the image display area (that is, the display screen S) of the liquid crystal display panel 2 can be visually recognized.

The rear cabinet 42 is a box that is open in front. The rear cabinet 42 houses in its interior the backlight module 1, the circuit unit 3, and so forth. The front side of the rear cabinet 42 is fitted into the front cabinet 41.

The cushioning member 43 is an elastic member made of rubber, for example. The cushioning member 43 is provided between the front cabinet 41 and the vicinity of the edge of the front face 2a of the liquid crystal display panel 2. That is, the front cabinet 41 and the rear cabinet 42 sandwich the backlight module 1 and the liquid crystal display panel 2 via the cushioning member 43.

The detailed configuration of the backlight module 1 will now be described. As shown in FIG. 1, the backlight module 1 comprises an optical sheet laminate 11 (e.g., an optical sheet), a diffusing plate 12, a frame 13, a reflective sheet 14, and an LED (light emitting diode) unit 15.

The optical sheet laminate 11 is a translucent sheet group in which a plurality of optical sheets are laminated. The optical sheet laminate 11 is disposed between the liquid crystal display panel 2 and the diffusing plate 12. In the illustrated embodiment, the optical sheet laminate 11 includes two optical sheets 11a and 11b (e.g., first optical sheet and at least one second optical sheet). The optical sheets 11a and 11b can be any type of optical sheet. In the illustrated embodiment, the optical sheets 11a and 11b are, for example, a light diffusion sheet that performs light diffusion, a lens sheet that focuses light, or the like. The type and number of the optical sheets included in the optical sheet laminate 11 are not limited to the example given in this embodiment. However, the optical sheet laminate 11 includes a plurality of (two or more) optical sheets. The type and number of the optical sheets included in the optical sheet laminate 11 can be appropriately changed according to the application of the backlight module 1 and so forth.

The optical sheets 11a and 11b are molded from a resin material such as PET, for example. The optical sheet 11a is disposed between the liquid crystal display panel 2 and the optical sheet 11b. At least part of the optical sheet 11b is in contact with the optical sheet 11a between the optical sheet 11a and the diffusing plate 12. In other words, in the optical sheet laminate 11, the optical sheet 11a is disposed on the liquid crystal display panel 2 side, and the optical sheet 11b is disposed on the diffusing plate 12 side. In this embodiment, the front face 113 of the optical sheet 11a is the front face 113 of the optical sheet laminate 11, and the rear face 114 of the optical sheet 11b is the rear face 114 of the optical sheet laminate 11. The detailed configuration of the optical sheets 11a and 11b will be described below.

The diffusing plate 12 is a rectangular light radiating panel. The diffusing plate 12 is disposed between the optical sheet laminate 11 and the reflecting sheet 14 and the LED unit 15. The optical sheet 11b and the optical sheet 11a are disposed on an installation face 121 of the diffusing plate 12 in that order. The diffusing plate 12 diffuses the light emitted from the LED unit 15 and radiates this emitted light from the installation face 121. The radiated light is irradiated on the liquid crystal display panel 2 via the optical sheet laminate 11.

The frame 13 is molded from a resin material or a metal material. The frame 13 holds the optical sheet laminate 11, the diffusing plate 12, and the reflective sheet 14. The frame 13 has a front frame 131 and a rear frame 132. The front frame 131 and the rear frame 132 are attached to a rib 41b of the front cabinet 41 with screws B1. The rear frame 132 is attached to the rear cabinet 42 with screws B2.

The front frame 131 is disposed so as to surround side peripheral edges of the optical sheet laminate 11, the diffusing plate 12, and the reflective sheet 14. The front frame 131 has a window 131a inside the frame shape. Light that has passed through the optical sheet laminate 11 is irradiated on the liquid crystal display panel 2 through the window 131a.

The rear frame 132 is a box that is open in front. The rear frame 132 houses in its interior the LED unit 15 and a part of the reflective sheet 14. The central portion of the rear frame 132 as seen from the front of the display device 100 is recessed toward the rear of the display device 100. The reflective sheet 14 is affixed to the bottom face 132a of this central portion. The LED unit 15 is disposed via the reflective sheet 14.

The reflective sheet 14 is a light reflecting member disposed between the diffusing plate 12 and the rear frame 132. The light reflected by the reflective sheet 14 is directed toward the diffusing plate 12. The reflective sheet 14 allows the light reflected by the diffusing plate 12 and the like to be reused, for example. Therefore, it contributes to improving the utilization efficiency of the light emitted from the LED unit 15.

The LED unit 15 is a light source unit that emits light toward the liquid crystal display panel 2. The LED unit 15 has a plurality of LEDs 151 and mounting boards 152 on which the LEDs 151 are mounted in a straight line. The LEDs 151 are an example of a light source that emits light. Each mounting board 152 is, for example, a slender board. A plurality of rows of mounting boards 152 are disposed in parallel on the bottom face 132a of the rear frame 132.

Figure 2:
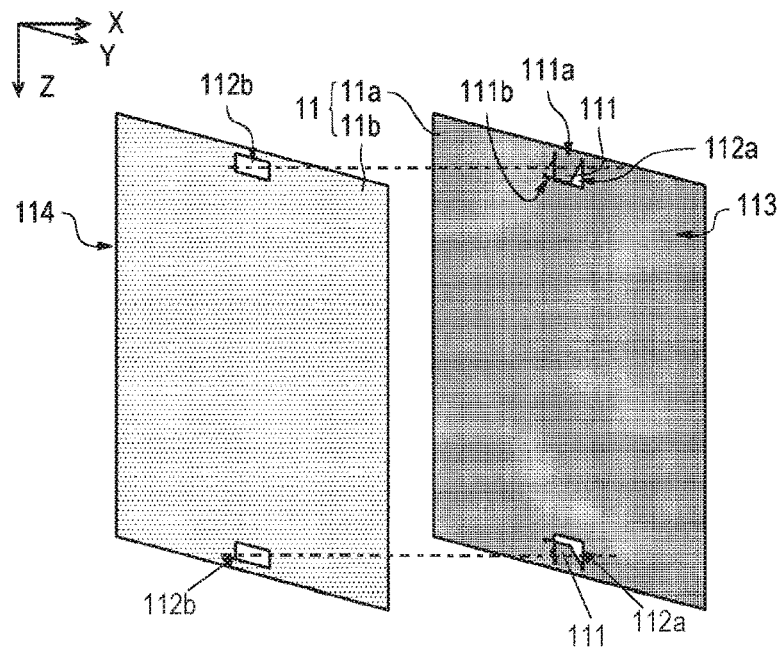
FIG. 2 is an exploded perspective view of an optical sheet laminate pertaining to the first embodiment.
Figure 3A:
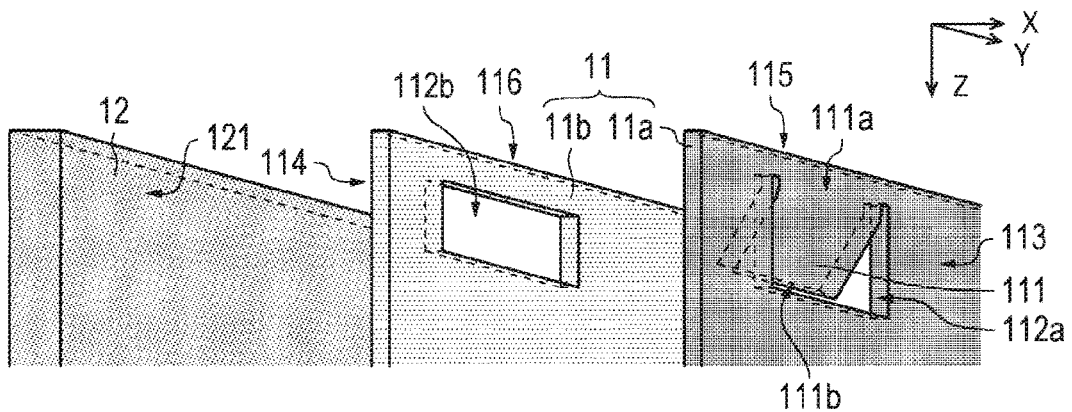
FIG. 3A is an exploded perspective view of the main components of the optical sheet laminate pertaining to the first embodiment.
Figure 3B:
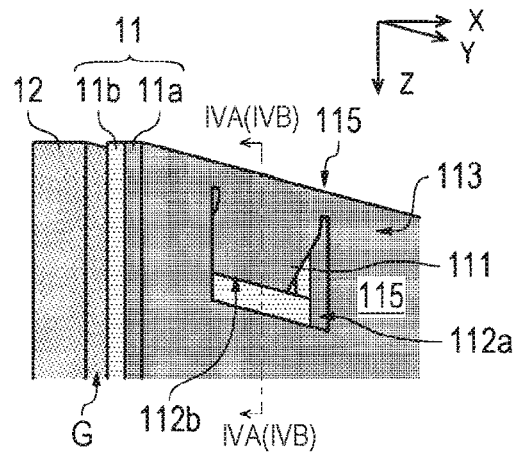
FIG. 3B is a detail perspective view of the main components of the optical sheet laminate pertaining to the first embodiment.
Figure 4A:
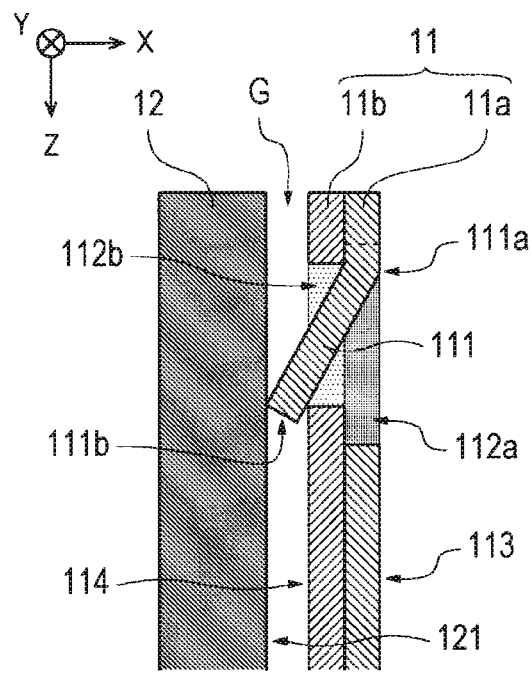
FIG. 4A is a cross sectional view of the main components of the optical sheet laminate pertaining to the first embodiment.
Figure 4B:
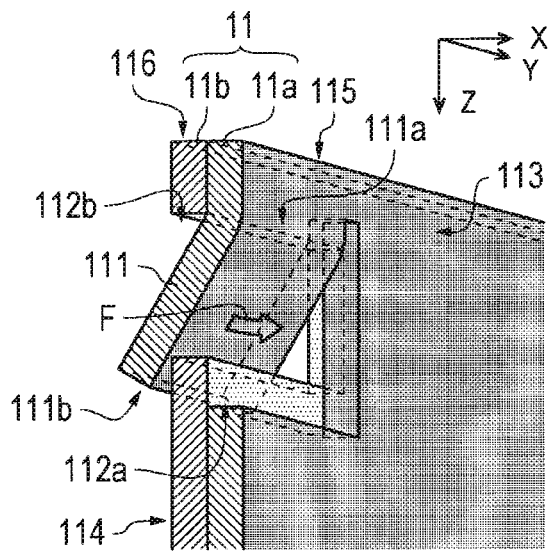
FIG. 4B is a perspective view including a cross section of the main components of the optical sheet laminate pertaining to the first embodiment.

The detailed configuration of the optical sheets 11a and 11b will now be described. FIG. 2 is an exploded perspective view of the optical sheet laminate 11 pertaining to the first embodiment. FIGS. 3A to 4B are views showing an example of the main components of the optical sheet laminate 11 pertaining to the first embodiment. FIG. 3A is an exploded perspective view of the main components of the optical sheet laminate 11 pertaining to the first embodiment. FIG. 3B is a detail perspective view of the main components of the optical sheet laminate 11 pertaining to the first embodiment. FIG. 4A is a cross section of the main components of the optical sheet laminate 11 pertaining to the first embodiment. FIG. 4B is a perspective view including a cross section of the main components of the optical sheet laminate 11 pertaining to the first embodiment. The hatched portions in FIGS. 4A and 4B show cross sectional views taken along the one-dot chain line IVA (IVB)-IVA (IVB) in FIG. 3B.

The optical sheet 11a on the liquid crystal display panel 2 side has a latching component 111 and an opening 112a. The latching component 111 and the opening 112a are provided by making a U-shaped cut in the surface of the optical sheet 11a. In this embodiment, the latching component 111 and the opening 112a are provided near the edge 115 of the rectangular optical sheet 11a. Two latching components 111 and two openings 112a are provided in FIG. 2. However, the present invention is not limited to this configuration, and these should be provided in the vicinity of at least one of the four edges 115 of the rectangular optical sheet 11a. Furthermore, the number of the latching components 111 and the openings 112a provided near one edge 115 is just one in FIGS. 2 to 4B. However, this is not the only option, and a plurality of these may be provided to each edge.

When not bent, the latching component 111 extends in a direction going away from the edge 115 of the optical sheet 11a. This direction is parallel to and the same orientation as the Z direction in FIGS. 2 to 4B, and is the direction in which the unbent latching component 111 extends from the proximal end 111a toward the distal end 111b. The Z direction is parallel to the portion of the optical sheet 11a excluding the latching component 111.

The proximal end 111a of the latching component 111 is connected to the portion of the optical sheet 11a excluding the latching component 111. The latching component 111 is bendable about the proximal end 111a in a cross sectional view (see FIG. 4A). The distal end 111b of the latching component 111 is not supported and is free. Hereinafter, the proximal end 111a of the latching component 111 will be referred to as the support end 111a, and the distal end 111b will be referred to as the free end 111b.

The opening 112a is a through opening formed in the optical sheet 11a when the latching component 111 is bent. In the illustrated embodiment, the latching component 111 being "bent" refers to a state in which the latching component 111 is not parallel to a specific portion of the optical sheet 11a other than the latching component 111. At least part of the opening 112a is covered by the latching component 111 in plan view as seen from a direction perpendicular to the front face 113 of the optical sheet laminate 11 (i.e., from the front). That is, when the latching component 111 is bent, in the above-mentioned plan view, the latching component 111 covers a part of the opening 112a. Also, when the latching component 111 is not bent, in the above-mentioned plan view, the latching component 111 covers all of the opening 112a excluding the cut portion produced when the cut is made.

The length of the latching component 111 is the same as the opening width of the opening 112a in the Z direction, excluding the cut width when the cut is made. However, the length of the latching component 111 is not limited to the example given in this embodiment. As long as the bent latching component 111 is long enough to sandwich the optical sheet 11b between itself and a specific portion of the optical sheet 11a other than the latching component 111, this length may be less than the opening width of the opening 112a in the Z direction. The length of the latching component 111 refers to the shortest distance along the latching component 111 between the support end 111a and the free end 111b.

The optical sheet 11b on the diffusing plate 12 side has an opening 112b. The opening 112b is a through opening formed in the optical sheet 11b. The opening width of the opening 112b in the Z direction is less than the length of the latching component 111. Also, in the Y direction parallel to the optical sheet 11b and perpendicular to the Z direction, the opening width of the opening 112b is equal to or greater than the width of the latching component 111 at the support end 111a. In the optical sheet 11b, the position where the opening 112b is provided is a position where the latching component 111 can be inserted. Just as with the latching component 111 and the opening 112a, the opening 112b should be provided in the vicinity of at least one of the four edges 116 of the rectangular optical sheet 11b. Furthermore, although the number of openings 112b provided in the vicinity of one edge 116 is just one in FIGS. 2 to 4B, that is not the only option, and a plurality of openings 112b may be provided to each edge.

The shape of the latching component 111 and the openings 112a and 112b is rectangular. However, the shape of at least one of the latching component 111 and the openings 112a and 112b is not limited to the example of this embodiment, and may be a shape other than a rectangle, such as a semicircle shape, or a triangle shape or other such polygonal shape.

When the optical sheet 11a is stacked on the optical sheet 11b, the latching component 111 is bent behind the optical sheet 11a and inserted into the opening 112b (see FIG. 3B). The optical sheet 11b is then sandwiched and held between the bent latching component 111 and a specific portion of the optical sheet 11a other than the latching component 111. Hereinafter, this structure will be referred to as "sandwiching structure." In particular, in this sandwiching structure, the specific portion of the optical sheet 11a other than the latching component 111 includes an edge portion of the opening 112a of the optical sheet 11a. Thus, in the illustrated embodiment, the optical sheet 11b is sandwiched between the latching component 111 and the edge portion of the opening 112a of the optical sheet 11a. Also, as shown in FIG. 3B, an edge portion of the opening 112b is sandwiched between the latching component 111 and the edge portion of the opening 112a of the optical sheet 11a.

With this sandwiching structure, a restoring force F, which tries to return the bent latching component 111 to a state in which it is not bent, is produced at the latching component 111 (see FIG. 4B). The restoring force F is a force based on the principle of leverage, and acts on the latching component 111 around the supporting end 111a. Accordingly, in the portion near the latching component 111, the optical sheet 11b is pressed by the restoring force F against a portion of the optical sheet 11a other than the latching component 111. Therefore, the optical sheets 11a and 11b are brought into close contact with each other. Thus, the optical sheet 11a can be laminated on the optical sheet 11b so that wrinkling does not occur during lamination, and the rigidity of the optical sheet laminate 11 (particularly the edge portions thereof) is improved.

Also, the sandwiching structure allows the optical sheets 11a and 11b to be laminated without the use of an adhesive or the like. Accordingly, the brightness of the light that passes through the optical sheet laminate 11 and is radiated to the liquid crystal display panel 2 is higher than when the optical sheets 11a and 11b are temporarily laminated using an adhesive. For example, when an adhesive is used to affix a converging lens sheet to the rear face of another optical sheet, the area near of the apex of the lens is affixed to the other optical sheet with the adhesive. Accordingly, the brightness of the light emitted from the lens sheet onto the liquid crystal display panel decreases. By contrast, with this embodiment, a reduction in brightness due to bonding with an adhesive or the like can be prevented.

Furthermore, even if the optical sheets 11a and 11b expand or contract due to moisture absorption, dehydration, and a temperature change, etc., it is less likely that one of the optical sheets 11a and 11b will be displaced with respect to the other one in a direction parallel to the optical sheets 11a and 11b. That is, even if one of the optical sheets 11a and 11b should bend, the other one inhibits the bending and relative movement of the one. Therefore, it is possible to suppress or prevent wrinkling of the optical sheets 11a and 11b.

Figure 5:
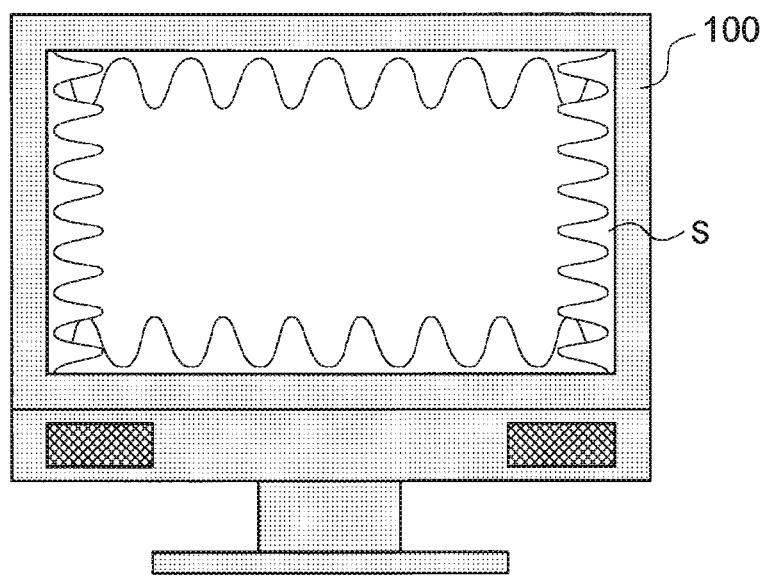
FIG. 5 is an example of the display screen when there are wrinkles in the optical sheet laminate.

Therefore, the deterioration in quality at the display screen S (especially the peripheral edges) of the display device 100 shown in FIG. 5, for example, that is attributable to wrinkling of the optical sheets 11a and 11b can be prevented. As a result, the high-quality display screen S shown in FIG. 6 can be obtained. Specifically, if wrinkling occurs near the edge 115 of the optical sheet 11a and/or near the edge 116 of the optical sheet 11b, as shown in FIG. 5, the image will end up being lost around the periphery of the display screen S. On the other hand, if no wrinkling occurs in the optical sheets 11a and 11b, the image will not be lost on the display screen S, and a high-quality image will be displayed, as shown in FIG. 6.

Figure 7:
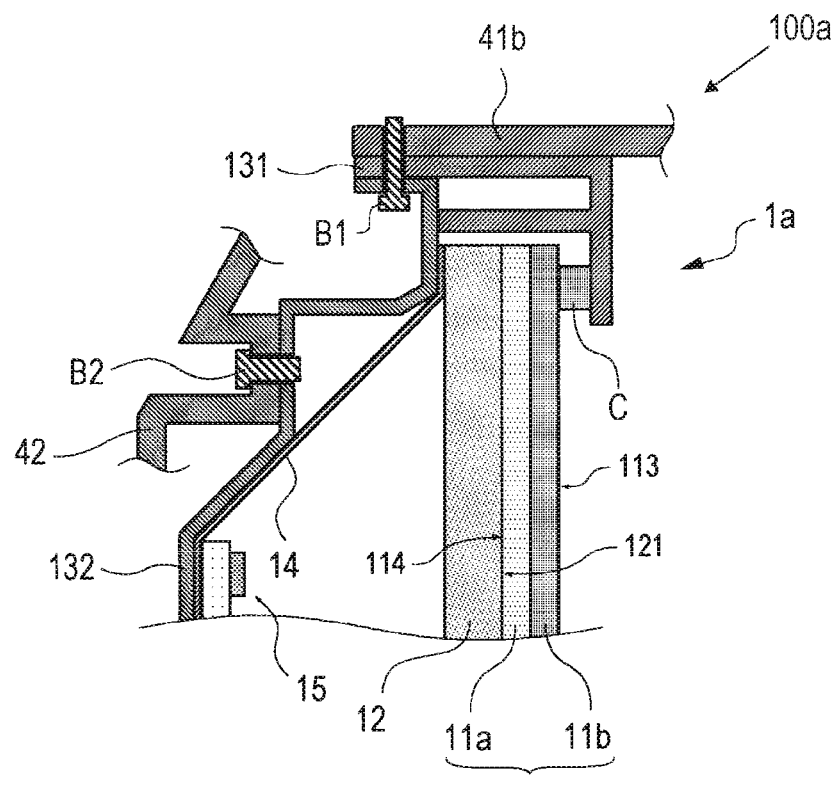
FIG. 7 is a detail cross section of an end of a display device in a comparative example in which an optical sheet laminate has no sandwiching structure.
Figure 8:
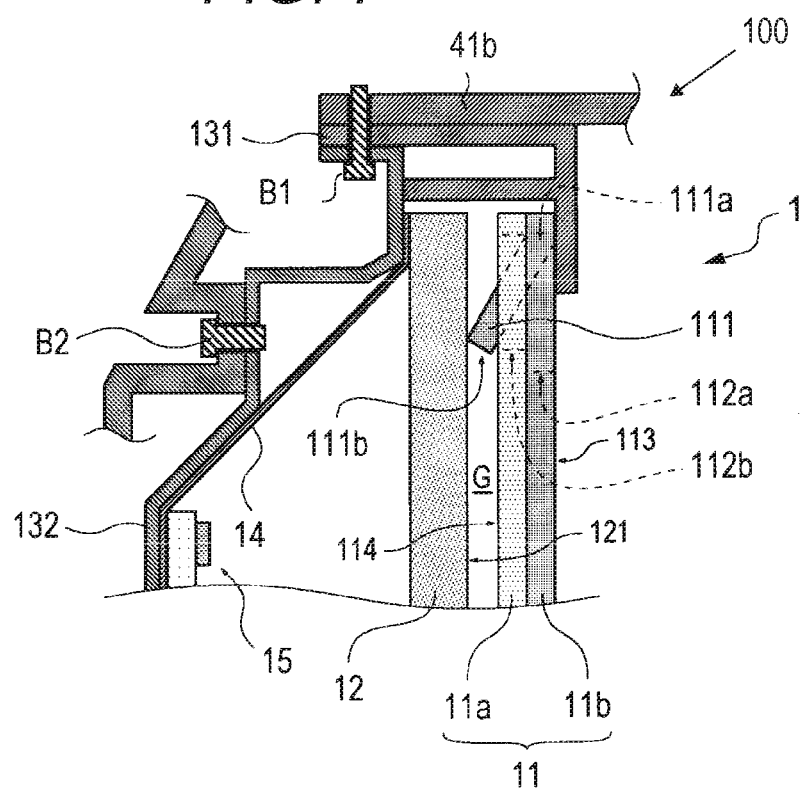
FIG. 8 is a detail cross section of an end of a display device pertaining to this embodiment in which an optical sheet laminate has a sandwiching structure.

Also, because the optical sheet laminate 11 has the sandwiching structure, fewer parts are required. FIG. 7 is a detail cross sectional view of an end of a display device 100a in a comparative example in which the optical sheet laminate 11 has no sandwiching structure. FIG. 8 is a detail cross sectional view of an end of the display device 100 of this embodiment in which the optical sheet laminate 11 does have the sandwiching structure.

As shown in FIG. 7, the display device 100a in the comparative example does not have a sandwiching structure using the latching component 111. Also, a cushioning member C, which is an elastic member made of rubber, for example, is provided near the edge of the front face 113 of the optical sheet laminate 11. The front frame 131 and the rear frame 132 sandwich the ends of the optical sheet laminate 11 via the cushioning member C. Also, the rear face 114 of the optical sheet laminate 11 is provided in close contact with the installation face 121 of the diffusing plate 12. With a configuration such as this, the thickness of the display device 100a (that is, the size in the front-to-rear direction) increases according to the thickness of the cushioning member C. Thus, the display device 100a ends up being larger. Also, if the optical sheet laminate 11 is displaced due to expansion, contraction, etc., friction between the optical sheet laminate 11 and the diffusing plate 12 may produce abrasion dust between these. If this happens, the light emitted from the diffusing plate 12 will be blocked or scattered by the abrasion dust. Thus, the brightness of the light emitted by the backlight module 1a ends up being diminished.

In contrast, as shown in FIG. 8, with the display device 100 in this embodiment having the sandwiching structure, the free end 111b of the latching component 111 inserted into the opening 112b protrudes from the opening 112b in the rear face 114 of the optical sheet laminate 11 (in the first embodiment, the rear face 114 of the optical sheet 11b), and abuts the installation face 121 of the diffusing plate 12. Thus, the latching component 111 protruding from the opening 112b allows the front frame 131 and the rear frame 132 to sandwich the end of the optical sheet laminate 11 without any gap, and without using the cushioning member C. Since the thickness of the air layer G is sufficiently less than the thickness of the cushioning member C, the thickness of the display device 100 does not increase that much. This contributes to making the display device 100 smaller.

Also, when the optical sheet laminate 11 is disposed on the diffusing plate 12, the gap G is formed between the rear face 114 of the optical sheet laminate 11 and the installation face 121 of the diffusing plate 12, as shown in FIG. 8. The gap G shall be referred to below as the air layer G. The formation of this air layer G prevents the rear face 114 of the optical sheet laminate 11 from contacting the installation face 121 of the diffusing plate 12. Thus, there is no friction between the optical sheet laminate 11 and the diffusing plate 12. Therefore, the occurrence of abrasion dust in the air layer G. Thus, the decrease in the brightness of the light emitted by the backlight module 1a that would be caused by abrasion dust, can be prevented.

Figure 9:
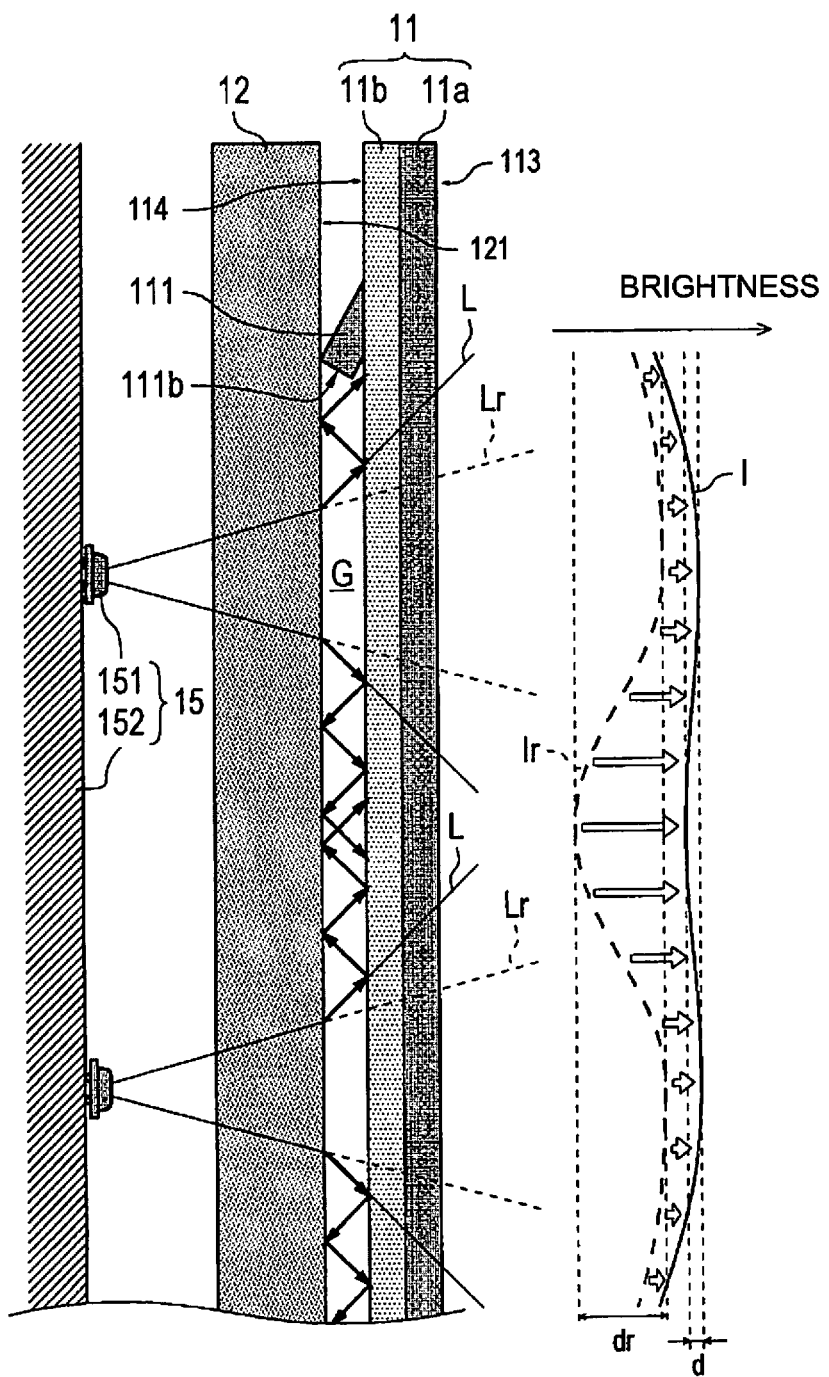
FIG. 9 is a diagram showing the brightness distribution of light radiated from a backlight module.

Furthermore, forming the air layer G improves the characteristics of the light emitted by the backlight module 1. FIG. 9 shows the brightness distribution of the light L radiated from the backlight module 1. In the graph on the right side of FIG. 9, the solid line I shows the brightness distribution of the light L radiated by the backlight module 1 toward the liquid crystal display panel 2 in this embodiment. The dotted line Ir shows the brightness distribution of the light Lr radiated by the backlight module 1a in which no gap G is formed (see FIG. 7), toward the liquid crystal display panel 2.

As shown in FIG. 9, the formation of the air layer G enhances the effect whereby the diffusing plate 12 diffuses the light emitted by the LED unit 15. More specifically, the radiation angle of the light L radiated from the installation face 121 is wider than the radiation angle of the light Lr. Therefore, the contrast d between the maximum brightness and the minimum brightness in the brightness distribution of the light L in a plan view seen from the front is less than the contrast dr in the light Lr. That is, the brightness distribution of the light L is closer to be uniform than is the brightness distribution of the light Lr.

In particular, the contrast between the brightness of the light L directly above the LEDs 151 and the brightness of the light L directly above a position between adjacent LEDs 151 becomes smaller. Thus, it is possible to moderate or prevent the contrast according to the disposition of the LEDs 151 that occurs in the brightness distribution of the light L. The shadows of members holding the diffusing plate 12 that occur in the brightness distribution of the light L can also be moderated or prevented.

Furthermore, the formation of the air layer G causes the light L reflected by the rear face 114 of the optical sheet laminate 11 to be reflected again by the installation face 121 of the diffusing plate 12, as indicated by the arrow depicted within the air layer G in FIG. 9, and is again directed toward the optical sheet laminate 11. That is, recycling (reuse) of the light L reflected by the rear face 114 occurs within the air layer G. The result of this light recycling, as shown by the solid line I in FIG. 9, is that the brightness of the light L increases, and is higher overall than the brightness of the light Lr. Therefore, it is possible to improve the utilization efficiency of the light emitted by the LED unit 15.

Modification Example of First Embodiment

In the first embodiment, the unbent latching component 111 extends away from the edge 115 of the optical sheet 11a. However, the direction in which the unbent latching component 111 extends is not limited to this example, and it may extend in some other direction.

Figure 10:
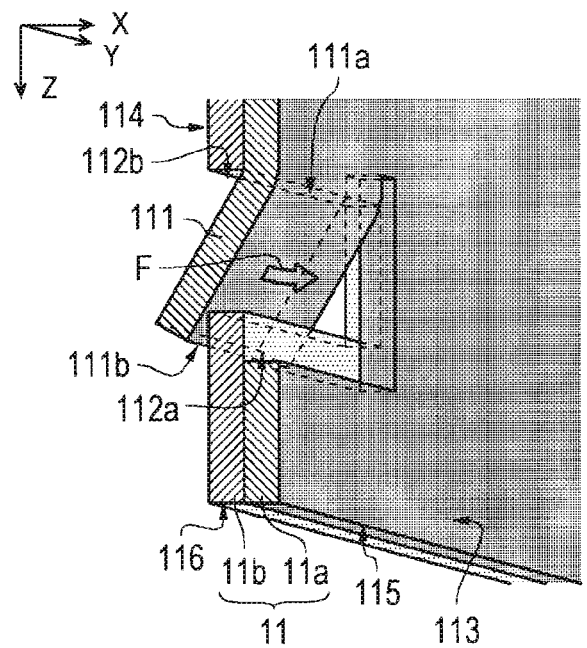
FIG. 10 is a perspective view including a cross section of the main components of an optical sheet laminate pertaining to a modification example of the first embodiment.

FIG. 10 is a perspective view including a cross section of the main components of the optical sheet laminate 11 pertaining to a modification example of the first embodiment. The hatched portions in FIG. 10 show cross sections of the optical sheets 11a and 11b that are parallel to the Y and Z directions.

As shown in FIG. 10, the support end 111a of the latching component 111 is located farther than the free end 111b from the edge 115. Therefore, the unbent latching component 111 extends toward the edge 115 of the optical sheet 11a. A configuration such as this also affords the same effect as the first embodiment.

With this first embodiment, the display device 100 comprises the LEDs 151, the liquid crystal display panel 2, and the optical sheet laminate 11. The LEDs 151 emit the light L. The liquid crystal display panel 2 displays images. The optical sheet laminate 11 transmit the light L directed to the liquid crystal display panel. The optical sheet laminate 11 includes the optical sheet 11a (first optical sheet) and the optical sheet 11b (at least one second optical sheet). The optical sheet 11a has the latching component 111. The optical sheet 11b at least partially contact with the optical sheet 11a. The optical sheet 11b is sandwiched between the latching component 111 and a specific portion of the optical sheet 11a other than the latching component 111.

With this configuration, the display device 100 includes a structure that sandwiches the optical sheet 11b between the latching component 111 and the specific portion of the optical sheet 11a other than the latching component 111. Accordingly, because of this sandwiching structure, even if one optical sheet of the optical sheets 11a and 11b tries to bend due to expansion or contraction attributable to moisture absorption, dehydration, or a temperature change, for example, the bending of the one optical sheet can be suppressed or prevented by the other optical sheet. More specifically, if the optical sheet 11a tries to bend, the optical sheet 11b can suppress or prevent bending of the optical sheet 11a. Similarly, if the optical sheet 11b tries to bend, the optical sheet 11a can suppress or prevent bending of the optical sheet 11b. Therefore, it is possible to improve the rigidity of the optical sheet laminate 11 in which the optical sheet 11b is disposed on the optical sheet 11a. This makes it possible to suppress or prevent wrinkling in the optical sheet 11a and 11b.

Furthermore, because of this sandwiching structure, the optical sheet 11b can be disposed and held on the optical sheet 11a without using an adhesive, for example. Therefore, it is also possible to prevent the brightness of the light L passing through the optical sheets 11a and 11b from decreasing due to the use of an adhesive.

Also, in the backlight module 1, the latching component 111 is provided near the edge 115 of the optical sheet 11a.

With this configuration, the optical sheets 11a and 11b can be brought into close contact with each other by the above-mentioned sandwiching structure formed near the edge 115 of the optical sheet 11a. Therefore, it is possible to improve the rigidity of the optical sheet laminate 11 in which the optical sheet 11b is disposed on the optical sheet 11a without hindering the passage of the light L in the central portion of the optical sheets 11a and 11b, and the effect of suppressing wrinkling can also be enhanced.

Also, in the backlight module 1, the optical sheet 11a may have the plurality of the latching components 111.

With this configuration, the above-mentioned sandwiching structure can be formed at a plurality of locations of the optical sheets 11a and 11b. This allows the optical sheets 11a and 11b to be brought into close contact with each other.

Also, in the backlight module 1, the planar shape of the optical sheet 11a may be rectangular. Also, the latching components 111 may be provided near the plurality of the edges 115 of the rectangle.

With this configuration, the above-mentioned sandwiching structure can be formed near the plurality of the edges 115 of the rectangular optical sheet 11a. Therefore, the optical sheets 11a and 11b more easily go into close contact with each other.

Also, in the backlight module 1, the opening 112b is formed in the optical sheet 11b. The latching component 111 is inserted into the opening 112b.

With this configuration, the above-mentioned sandwiching structure can be formed by inserting the latching component 111 into the opening 112b.

Also, in the backlight module 1, the length of the latching component 11 along the latching component 111 between the support end 111a (proximal end) and the free end 111b (distal end) of the latching component 111 is equal to or greater than the width of the opening 112b in the direction extending from the support end 111a to the free end 111b of the latching component 111.

With this configuration, the optical sheet 11b can be more reliably sandwiched by the latching component 111 inserted into the opening 112b and the specific portion of the optical sheet 11a other than the latching component 111.

Also, in the backlight module 1, the plurality of the openings 112b may be formed in the optical sheet 11b.

With this configuration, because the latching component 111 is inserted into the openings 112b at a plurality positions, a plurality of the above-mentioned sandwiching structures are formed at the optical sheets 11a and 11b so that the optical sheets 11a and 11b can be brought into close contact with each other.

Also, in the backlight module 1, the backlight module 1 may include a plurality of optical sheets 11b.

With this configuration, the above-mentioned sandwiching structure allows the optical sheet 11a and the plurality of the optical sheets 11b to be brought into close contact with each other.

Also, the backlight module 1 further comprises the diffusing plate 12 that diffuses the light emitted by the LEDs 151. The optical sheet 11b and the optical sheet 11a are disposed in that order on the diffusing plate 12. The free end 111b (one end) of the latching component 111 abuts the diffusing plate 12, and this provides the air layer G (gap) between the diffusing plate 12 and the optical sheet 11b.

With this configuration, the air layer G is formed between the diffusing plate 12 and the optical sheet 11b. Thus, the radiation angle of the light L diffused and radiated by the diffusing plate 12 can be widened. Therefore, it is possible to lower the contrast in the brightness distribution of the light L radiated from the diffusing plate 12 in a plan view as seen in a direction perpendicular to the plane in which the light L is emitted. Also, this brightness distribution can be made more uniform. This makes it possible to moderate or prevent the contrast according to the disposition of the LEDs 151 that occurs in this brightness distribution, shadows of members holding the diffusing plate 12, etc.

Furthermore, because the air layer G is formed between the diffusing plate 12 and the optical sheet 11b, the light L reflected by the surface of the optical sheet 11b can be recycled (reused). More specifically, the light L reflected by the rear face 114 of the optical sheet 11b can be reflected by the diffusing plate 12 and emitted again toward the optical sheet 11b. This light recycling increases the brightness of the light L emitted from the backlight module 1 and increases the utilization efficiency of the light emitted by the LEDs 151.

As shown in FIGS. 1 and 10, the latching component 111 extends away from the liquid crystal display panel 2 (to the rear) with respect to the specific portion of the optical sheet 11a other than the latching component 111.

Also, as shown in FIG. 3A, the latching component 111 extends away from the edge 115 of the optical sheet 11a.

Also, as shown in FIG. 10, the latching component 111 extends towards the edge 115 of the optical sheet 11a.

Also, as shown in FIG. 1, the optical sheet 11a (e.g., first optical sheet) is disposed between the liquid crystal display panel 2 and the optical sheet 11b (e.g., at least one second optical sheet).

Second Embodiment

A second embodiment will now be described. In the second embodiment, the optical sheet 11b on the diffusing plate 12 side has the latching component 111 and the opening 112a. The optical sheet 11a that is disposed at least partially contacts with the optical sheet 11b on the liquid crystal display panel 2 side has the opening 112b. The parts of the second embodiment that differ from the first embodiment will be described below. Those components that are the same as in the first embodiment are labeled the same and may not be described again.

Figure 11:
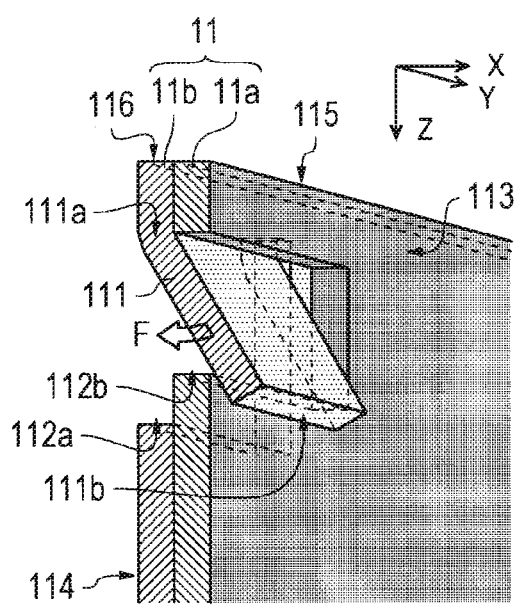
FIG. 11 is a perspective view including a cross section of the main components of an optical sheet laminate pertaining to a second embodiment.

FIG. 11 is a perspective view including a cross section of the main components of the optical sheet laminate 11 pertaining to the second embodiment. The hatched portions in FIG. 11 show cross sections of the optical sheets 11a and 11b that are parallel to the Y and Z directions.

The latching component 111 and the opening 112a are provided by making a U-shaped cut in the surface of the optical sheet 11b. In this embodiment, the latching component 111 and the opening 112a are provided near the edge 116 of the rectangular optical sheet 11b. The latching component 111 and the opening 112a may be provided near at least one of the four edges 116 of the rectangular optical sheet 11b. Furthermore, only one latching component 111 and one opening 112a is provided near one edge 116 in FIG. 11, but the number is not limited to this example, and may be two or more.

The unbent latching component 111 extends away from the edge 116 of the optical sheet 11b. The present invention is not limited to the example shown in FIG. 11. The latching component 111 may extend toward the edge 116 of the optical sheet 11b. The support end 111a (that is, the proximal end) of the latching component 111 is connected with a portion of the optical sheet 11b other than the latching component 111. The latching component 111 is bendable about the support end 111a in cross section. The opening 112a is a through opening produced in the optical sheet 11b when the latching component 111 is bent.

The length of the latching component 111 is the same as the opening width of the opening 112a in the Z direction, excluding the cut width when a cut is made. However, the example in this embodiment is not the only option. As long as the latching component 111 is long enough that the latching component 111 in a bent state will sandwich the optical sheet 11a between itself and a specific portion of the optical sheet 11b other than the latching component 111, its length may be less than the opening width of the opening 112a in the Z direction.

In the optical sheet 11a, the opening 112b is provided at a location where the latching component 111 can be inserted therein. The opening 112b, like the latching component 111 and the opening 112a, should be provided near at least one of the four edges 115 of the rectangular optical sheet 11a. The number of the openings 112b provided near one edge 115 is just one in FIG. 11, but is not limited to this example, and may be two or more.

When the optical sheet 11a is laminated on the optical sheet 11b, the latching component 111 is bent in front of the optical sheet 11b and inserted into the opening 112b. The optical sheet 11a is then sandwiched and held between the bent latching component 111 and a specific portion of the optical sheet 11b other than the latching component 111. In particular, in this sandwiching structure, the specific portion of the optical sheet 11b other than the latching component 111 includes an edge portion of the opening 112a of the optical sheet 11b. Thus, in the illustrated embodiment, the optical sheet 11a is sandwiched between the latching component 111 and the edge portion of the opening 112a of the optical sheet 11b. Also, as shown in FIG. 11, an edge portion of the opening 112b is sandwiched between the latching component 111 and the edge portion of the opening 112a of the optical sheet 11b. With this sandwiching structure, the optical sheet 11a is pressed by the restoring force F of the latching component 111 against the specific portion of the optical sheet 11b other than the latching component 111, at a portion near the latching component 111. Therefore, the optical sheets 11a and 11b are brought into close contact with each other. Thus, the optical sheet 11a can be laminated on the optical sheet 11b, without the use of an adhesive or the like, so that no wrinkling occurs in this lamination. Thus, this increases the rigidity of the optical sheet laminate 11 (particularly the edge portions thereof). Furthermore, if one of the optical sheets 11a and 11b tries to bend, the other one will suppress bending and relative movement of the one. Thus, wrinkling of the optical sheets 11a and 11b can be suppressed or prevented.

With the display device 100 in this second embodiment, the optical sheet 11b (first optical sheet) has the latching component 111. The optical sheet 11a (at least one second optical sheet) at least partially contacts with the optical sheet 11b. The optical sheet 11a is sandwiched between the latching component 111 and the specific portion of the optical sheet 11b other than the latching component 111.

With this configuration, the display device 100 includes a structure that sandwiches the optical sheet 11a between the latching component 111 and the specific portion of the optical sheet 11b other than the latching component 111. Accordingly, because of this sandwiching structure, even if one optical sheet of the optical sheets 11a and 11b tries to bend due to expansion or contraction attributable to moisture absorption, dehydration, or a temperature change, for example, the bending of the one optical sheet can be suppressed or prevented by the other optical sheet. More specifically, if the optical sheet 11a tries to bend, the optical sheet 11b can suppress or prevent bending of the optical sheet 11a. Similarly, if the optical sheet 11b tries to bend, the optical sheet 11a can suppress or prevent bending of the optical sheet 11b. Therefore, it is possible to improve the rigidity of the optical sheet laminate 11 in which the optical sheet 11b is disposed on the optical sheet 11a. This makes it possible to suppress or prevent wrinkling in the optical sheet 11a and 11b.

Furthermore, because of the above-mentioned sandwiching structure, the optical sheet 11a can be disposed and held on the optical sheet 11b without the use of an adhesive, for example. Therefore, it is also possible to prevent a decrease in the brightness of the light L passing through the optical sheets 11a and 11b that is attributable to the use of an adhesive, etc.

Also, in the backlight module 1, the latching component 111 is provided near the edge 116 of the optical sheet 11b.

With this configuration, because of this sandwiching structure formed near the edge 116 of the optical sheet 11b, the optical sheets 11a and 11b can be brought into close contact with each other. Therefore, it is possible to improve the rigidity of the optical sheet laminate 11 in which the optical sheet 11a is disposed on the optical sheet 11b without hindering the passage of the light L in the central portion of the optical sheets 11a and 11b, and the effect of suppressing wrinkling can also be improved.

Also, in the backlight module 1, the optical sheet 11b can have a plurality of latching components 111.

With this configuration, the above-mentioned sandwiching structure can be formed at a plurality of locations of the optical sheets 11a and 11b, allowing the sheets to be brought into close contact with each other.

Also, in the backlight module 1, the planar shape of the optical sheet 11b may be rectangular. The latching components 111 may be provided near the plurality of the edges 116 of the rectangle.

With this configuration, the above-mentioned sandwiching structure can be formed near the plurality of the edges 116 of the rectangular optical sheet 11b. Therefore, the optical sheets 11a and 11b more easily go into close contact with each other.

Also, in the backlight module 1, the opening 112b is formed in the optical sheet 11a. The latching component 111 is inserted into the opening 112b.

With this configuration, the above-mentioned sandwiching structure can be formed by inserting the latching component 111 into the opening 112b.

Also, in the backlight module 1, a plurality of openings 112b may be formed in the optical sheet 11a.

With this configuration, because the latching components 111 are inserted into the openings 112b at a plurality positions, a plurality of the above-mentioned sandwiching structures are formed at the optical sheets 11a and 11b so that the sheets can be brought into close contact with each other.

Also, in the backlight module 1, the backlight module 1 may include a plurality of optical sheets 11a.

With this configuration, the above-mentioned sandwiching structure allows the plurality of the optical sheets 11a and the optical sheet 11b to be brought into close contact with each other.

As shown in FIG. 11, the latching component 111 extends towards the liquid crystal display panel 2 (FIG. 1) (to the front) with respect to the specific portion of the optical sheet 11b other than the latching component 111.

Third Embodiment

A third embodiment will now be described. In the third embodiment, the area near the edge 116 of the optical sheet 11b (e.g., the part of the at least one second optical sheet near the edge of the second optical part) is sandwiched between the latching component 111 provided to the optical sheet 11a and a specific portion of the optical sheet 11a other than the latching component 111. The parts of the third embodiment that differ from the first and second embodiments will be described below. Those components that are the same as in the first and second embodiments are labeled the same and may not be described again.

Figure 12:
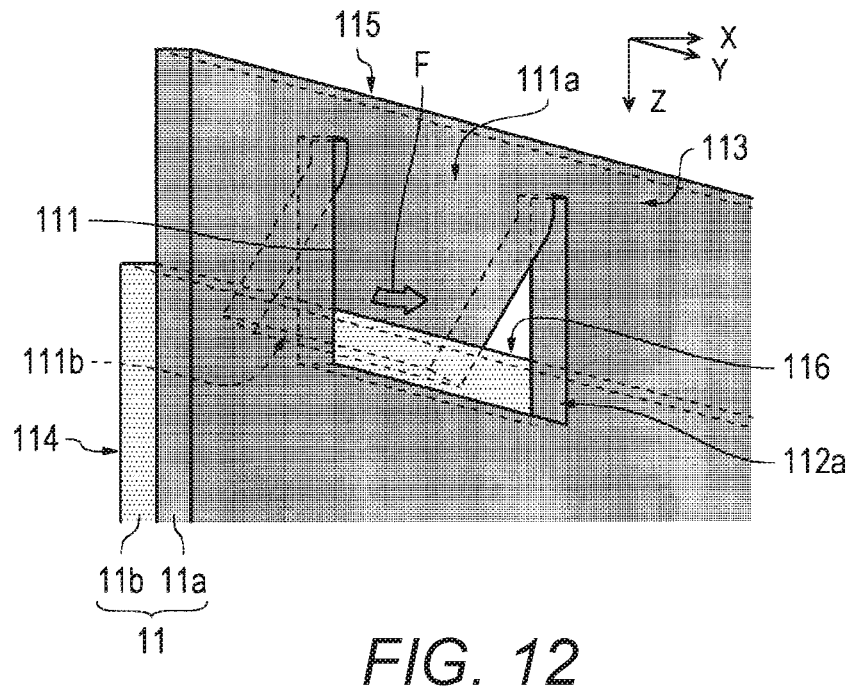
FIG. 12 is a detail perspective view of the main components of an optical sheet laminate pertaining to a third embodiment.

FIG. 12 is a detail perspective view of the main components of the optical sheet laminate 11 pertaining to the third embodiment. As shown in FIG. 12, the optical sheet 11a on the liquid crystal display panel 2 side has the latching component 111 and the opening 112a. The configuration of the optical sheet 11a is the same as in the first embodiment. Thus, it will not be described again. On the other hand, the optical sheet 11b on the diffusing plate 12 side does not have the opening 112b. The planar size of the optical sheet 11b is smaller than the planar size of the optical sheet 11a. In particular, the optical sheet 11b is smaller than the optical sheet 11a in the Z direction.

When the optical sheet 11*a* is laminated on the optical sheet 11*b*, the latching component 111 is bent to the rear of the optical sheet 11*a*. The area near the edge 116 of the optical sheet 11*b* is sandwiched and held between the bent latching component 111 and a specific portion of the optical sheet 11*a* other than the latching component 111. In particular, in this sandwiching structure, the specific portion of the optical sheet 11*a* other than the latching component 111 includes an edge portion of the opening 112*a* of the optical sheet 11*a*. Thus, in the illustrated embodiment, the optical sheet 11*b* is sandwiched between the latching component 111 and the edge portion of the opening 112*a* of the optical sheet 11*a*. With this sandwiching structure, the area near the edge 116 of the optical sheet 11*b* is pressed by the restoring force F of the latching component 111 against the specific portion of the optical sheet 11*a* other than the latching component 111, near the latching component 111. Therefore, the optical sheets 11*a* and 11*b* are brought into close contact with each other. Thus, the optical sheet 11*a* can be laminated on the optical sheet 11*b*, without the use of an adhesive or the like, so that no wrinkling occurs in this lamination. This increases the rigidity of the optical sheet laminate 11 (particularly the edge portions thereof). Furthermore, if one of the optical sheets 11*a* and 11*b* tries to bend, the other one will suppress bending and relative movement of the one. Thus, wrinkling of the optical sheets 11*a* and 11*b* can be suppressed or prevented.

In FIG. 12, the unbent latching component 111 extends away from the edge 115 of the optical sheet 11*a*. However, the present invention is not limited to the example shown in FIG. 12.

With this third embodiment, in the display device 100, the area near the edge 116 of the optical sheet 11*b* is sandwiched between the latching component 111 and the specific portion of the optical sheet 11*a* other than the latching component 111.

With this configuration, even though the optical sheet 11*b* is not provided with a portion that engages with the latching component 111 (such as the opening 112*b* into which the latching component 111 is inserted), for example, the area near the edge 116 of the optical sheet 11*b* can be sandwiched between the latching component 111 and the specific portion of the optical sheet 11*a* other than the latching component 111. In other words, the above-mentioned sandwiching structure can be formed and the optical sheets 11*a* and 11*b* can be brought into close contact with each other even though the optical sheet 11*b* is not processed.

Also, in the backlight module 1, the planar size of the optical sheet 11*b* is smaller than the planar size of the optical sheet 11*a*.

With this configuration, the optical sheet 11*b* does not stick out from above the optical sheet 11*a*, and the above-mentioned sandwiching structure allows the optical sheets 11*a* and 11*b* to be brought into close contact with each other.

Fourth Embodiment

A fourth embodiment will now be described. In the fourth embodiment, the area near the edge 115 of the optical sheet 11*a* (e.g., the part of the at least one second optical sheet near the edge of the second optical part) is sandwiched between the latching component 111 provided to the optical sheet 11*b* and a specific portion of the optical sheet 11*b* other than the latching component 111. The parts of the fourth embodiment that differ from the first to third embodiments will be described below. Those components that are the same as in the first to third embodiments are labeled the same and may not be described again.

Figure 13:
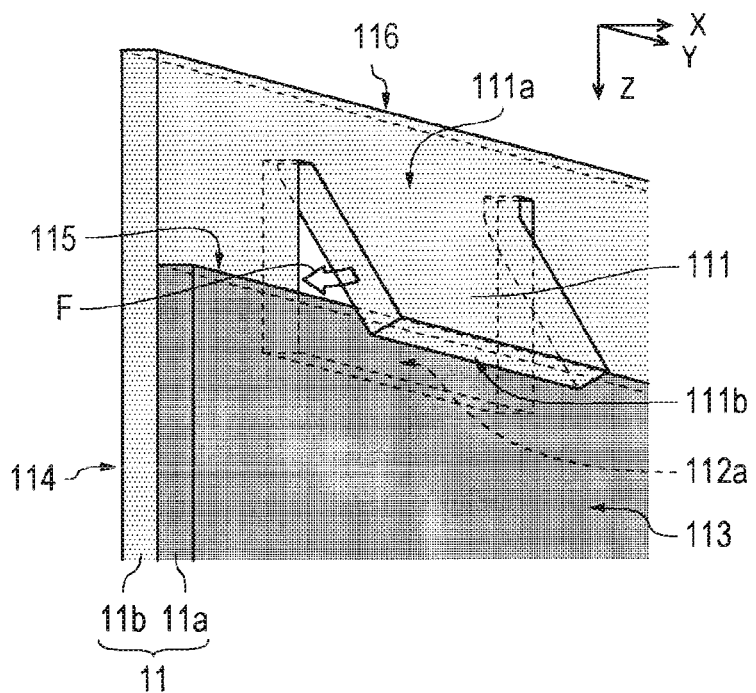
FIG. 13 is a detail perspective view of the main components of an optical sheet laminate pertaining to a fourth embodiment.

FIG. 13 is a detail perspective view of the main components of the optical sheet laminate 11 pertaining to the fourth embodiment. As shown in FIG. 13, the optical sheet 11*b* on the diffusing plate 12 side has the latching component 111 and the opening 112*a*. Since the configuration of the optical sheet 11*b* is the same as in the second embodiment, it will not be described again. On the other hand, the optical sheet 11*a* on the liquid crystal display panel 2 side does not have the opening 112*b*. The planar size of the optical sheet 11*a* is smaller than the planar size of the optical sheet 11*b*. In particular, the optical sheet 11*a* is smaller than the optical sheet 11*b* in the Z direction.

When the optical sheet 11*a* is laminated on the optical sheet 11*b*, the latching component 111 is bent in front of the optical sheet 11*b*. The area near the edge 115 of the optical sheet 11*a* is sandwiched and held between the bent latching component 111 and the specific portion of the optical sheet 11*b* other than the latching component 111. In particular, in this sandwiching structure, the specific portion of the optical sheet 11*b* other than the latching component 111 includes an edge portion of the opening 112*a* of the optical sheet 11*b*. Thus, in the illustrated embodiment, the optical sheet 11*a* is sandwiched between the latching component 111 and the edge portion of the opening 112*a* of the optical sheet 11*b*. With this sandwiching structure, in the vicinity of the latching component 111, the area near the edge 115 of the optical sheet 11*a* is pressed by the restoring force F of the latching component 111 against the specific portion of the optical sheet 11*b* other than the latching component 111. Therefore, the optical sheets 11*a* and 11*b* are in close contact with each other. Thus, the optical sheet 11*a* can be laminated on the optical sheet 11*b* without the use of an adhesive or the like, so that no wrinkling occurs in this lamination. This increases the rigidity of the optical sheet laminate 11 (particularly the edge portions thereof). Furthermore, if one of the optical sheets 11*a* and 11*b* tries to bend, the other one will suppress bending and relative movement of the one. Thus, wrinkling of the optical sheets 11*a* and 11*b* can be suppressed or prevented.

In FIG. 13, the unbent latching component 111 extends away from the edge 116 of the optical sheet 11*b*. However, the present invention is not limited to the example shown in FIG. 13.

With this fourth embodiment, in the backlight module 1, the area near the edge 115 of the optical sheet 11*a* is sandwiched between the latching component 111 and the specific portion of the optical sheet 11*b* other than the latching component 111.

With this configuration, even though the optical sheet 11*a* is not provided with a portion that engages with the latching component 111 (such as the opening 112*b* into which the latching component 111 is inserted), the area near the edge 115 of the optical sheet 11*a* can be sandwiched between the latching component 111 and the specific portion of the optical sheet 11*b* other than the latching component 111. In other words, even though the optical sheet 11*a* is not processed, the above-mentioned sandwiching structure can be formed at the optical sheets 11*a* and 11*b*, and these optical sheets can be brought into close contact with each other.

Also, in the backlight module 1, the planar size of the optical sheet 11*a* is smaller than the planar size of the optical sheet 11*b*.

With this configuration, the optical sheets 11a and 11b can be brought into close contact with each other without the optical sheet 11a sticking out from above the optical sheet 11b.

Selected embodiments of the present invention are described above. However, the above embodiments are merely examples. It should be obvious to those skilled in the art that various modifications can be made to the combinations of the constituent elements and the processing, and that this falls within the range of the present invention.

For example, in the first to fourth embodiments, the direct-type backlight module 1 is described as an example. However, the scope of the present invention is not limited to or by this example. The present invention is also applicable to a backlight module of an edge light type. In this case, the back light module 1 comprises a light guide plate for directing the light emitted from the light source toward the liquid crystal display panel 2, and a light source such as the LED unit 15 is disposed opposite the side face of the light guide plate.

In the first to fourth embodiments, the optical sheet laminate 11 has the two optical sheets 11a and 11b. However, the scope of the present invention is not limited to or by this example. The number of optical sheets included by the optical sheet laminate 11 may be three or more. In this case, the sandwiching structure produced by the latching component 111 may be formed for each adjacent optical sheet, or may be formed on the optical sheet at the uppermost layer and the optical sheet at the lowermost layer.

Figure 14:
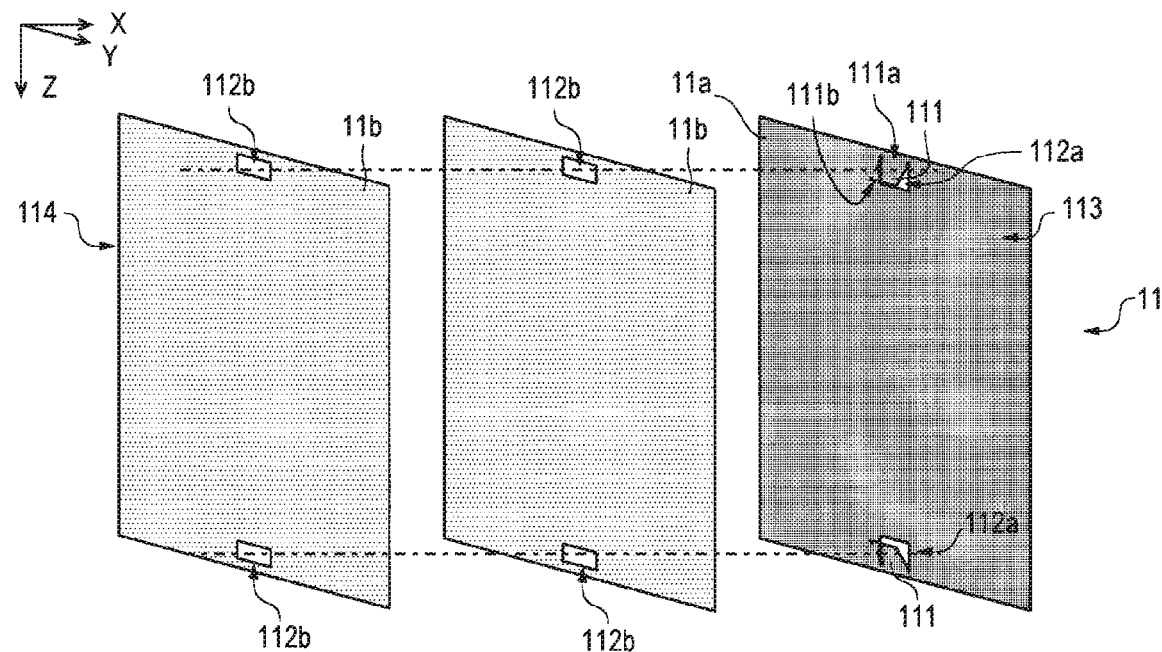
FIG. 14 is an exploded perspective view of an optical sheet laminate pertaining to a modification example.

Specifically, as shown in FIG. 14, the optical sheet laminate 11 can have the optical sheet 11a (e.g., first optical sheet) having the latching component 111 and a plurality of optical sheets 11b (e.g., at least one second optical sheets) each having an opening 112b. In this case, the latching component 111 of the optical sheet 11a is disposed through the openings 112b of the optical sheets 11b. In this modification example, the optical sheet laminate 11 shown in FIG. 14 includes an additional optical sheet 11b with respect to the configuration shown in FIG. 2. Of course, similarly, the optical sheet laminate 11 can include an additional optical sheet 11a with respect to the configuration shown in FIG. 11. Also, similarly, the optical sheet laminate 11 can include an additional optical sheet 11b with respect to the configuration shown in FIG. 12. Furthermore, similarly, the optical sheet laminate 11 can include an additional optical sheet 11a with respect to the configuration shown in FIG. 13.

Figure 15:
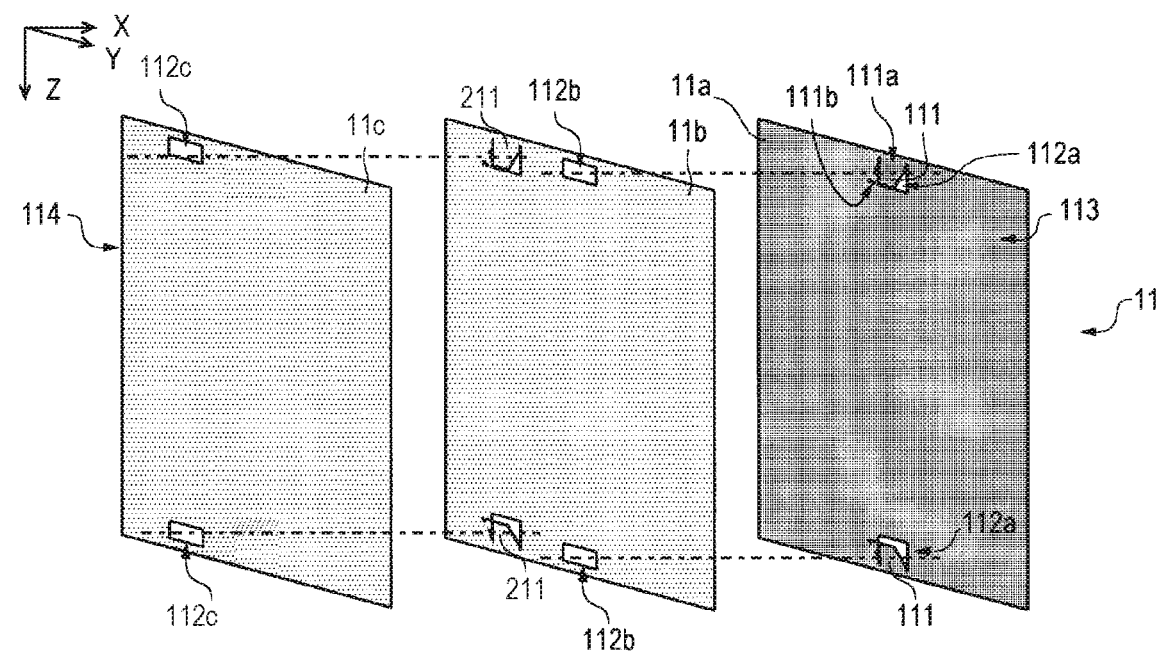
FIG. 15 is an exploded perspective view of an optical sheet laminate pertaining to another modification example.

Also, as shown in FIG. 15, the optical sheet laminate 11 can further have an optical sheet 11c (e.g., third optical sheet) with respect to the configuration shown in FIG. 2. The optical sheet 11c at least partially contacts with the optical sheet 11b (e.g., at least one second optical sheet). In this modification example, as shown in FIG. 15, the optical sheet 11b further has a pair of latching components 211 (e.g., second latching components). Thus, as shown in FIG. 15, the optical sheet 11b has the openings 112b and the latching components 211 at different locations. Furthermore, the optical sheet 11c has a pair of openings 112c (e.g., second openings). With the optical sheet laminate 11 in this modification example, the latching components 211 of the optical sheet 11b are disposed through the openings 112c, respectively, in a manner similar to the above-mentioned embodiment. Then, the optical sheet 11c is sandwiched between the latching component 211 and a specific portion of the optical sheet 11b other than the latching component 211.

Figure 16:
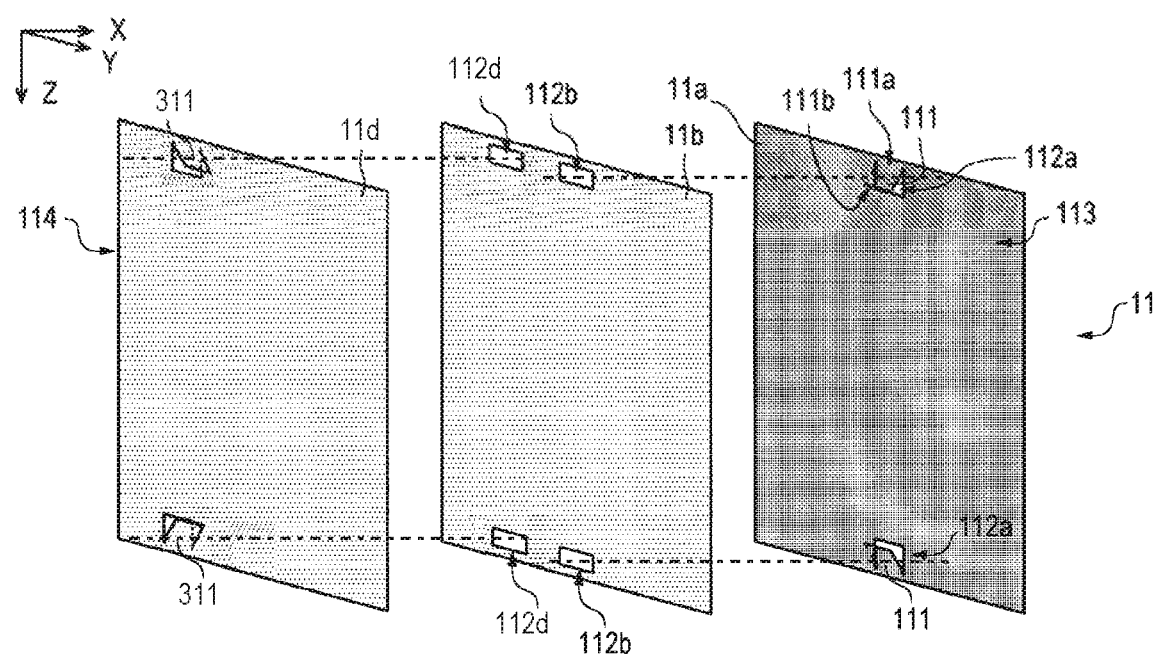
FIG. 16 is an exploded perspective view of an optical sheet laminate pertaining to yet another modification example.

Furthermore, as shown in FIG. 16, the optical sheet laminate 11 can further have an optical sheet 11d (e.g., fourth optical sheet) with respect to the configuration shown in FIG. 2. The optical sheet 11d at least partially contacts with the optical sheet 11b (e.g., at least one second optical sheet). In this modification example, as shown in FIG. 16, the optical sheet 11b further has a pair of openings 112d (e.g., third openings). Thus, as shown in FIG. 16, the optical sheet 11b has the openings 112b and the openings 112d at different locations. Furthermore, the optical sheet 11d has a pair of latching components 311 (e.g., third latching components). With the optical sheet laminate 11 in this modification example, the latching components 311 of the optical sheet 11d are disposed through the openings 112d, respectively, in a manner similar to the above-mentioned embodiment. Then, the optical sheet 11b is sandwiched between the latching component 311 and a specific portion of the optical sheet 11d other than the latching component 311.

In the first to fourth embodiments, the LEDs 151 are used as the light source. However, the scope of the present invention is not limited to or by this example. The light source may be some light emitting member other than the LEDs 151, and may be a cold-cathode tube, for example.

[1] In view of the state of the known technology and in accordance with an aspect of the present invention, a display device comprises a light source, a display panel, and an optical sheet. The light source is configured to emit light. The display panel is configured to display image. The optical sheet is configured to transmit the light directed to the display panel. The optical sheet includes a first optical sheet having a latching component, and at least one second optical sheet at least partially contacting with the first optical sheet. The at least one second optical sheet is sandwiched between the latching component and a specific portion of the first optical sheet other than the latching component (first configuration).

With the above first configuration, the display device includes a structure in which the at least one second optical sheet is sandwiched between the latching component and the specific portion of the first optical sheet other than the latching component. Accordingly, because of this sandwiching structure, even if one optical sheet of the first optical sheet and the at least one second optical sheet tries to bend due to expansion or contraction attributable to moisture absorption, dehydration, or a temperature change, for example, the bending of the one optical sheet can be suppressed or prevented by the other optical sheet. Therefore, the rigidity of the laminate in which the at least one second optical sheet is disposed on the first optical sheet can be increased. This suppresses or prevents wrinkling in the first optical sheet and the at least one second optical sheet.

Furthermore, because of this sandwiching structure, the at least one second optical sheet can be disposed and held on the first optical sheet without using an adhesive, for example.

[2] In accordance with a preferred embodiment according to the display device in the first configuration, the latching component is provided near an edge of the first optical sheet (second configuration).

With the second configuration, the first optical sheet and the at least one second optical sheet can be brought into close contact with each other by the above-mentioned sandwiching structure formed near the edge of the first optical sheet. Therefore, it is possible to improve the rigidity of the laminate in which the at least one second optical sheet is disposed on the first optical sheet without hindering the passage of light in the central portion of the first optical sheet and the at least one second optical sheet, and the effect of suppressing wrinkling can also be enhanced.

[3] In accordance with a preferred embodiment according to the display device in the first or second configuration above, the first optical sheet has a plurality of latching components (third configuration).

With the third configuration, the sandwiching structure is formed at a plurality of positions of the first optical sheet and the at least one second optical sheet so that the two can be brought into close contact with each other.

[4] In accordance with a preferred embodiment according to the display device in the third configuration above, the first optical sheet has a rectangular planar shape, and the latching components are provided near a plurality of edges of the rectangular planar shape (fourth configuration).

With the fourth configuration, the sandwiching structure can be formed near the plurality of the edges of the rectangular first optical sheet. Therefore, the first optical sheet and the at least one second optical sheet can more easily closely contact with each other.

[5] In accordance with a preferred embodiment according to the display device in any one of the first to fourth configurations described above, the at least one second optical sheet has an opening, and the latching component is disposed through the opening (fifth configuration).

With the fifth configuration, the sandwiching structure can be formed by inserting the latching component into the opening.

[6] In accordance with a preferred embodiment according to the display device in the fifth configuration, the latching component extends from the first optical sheet, and has a length along the latching component between a proximal end and a distal end of the latching component that is equal to or greater than a width of the opening in a direction extending from the proximal end to the distal end of the latching component (sixth configuration).

With the sixth configuration, the at least one second optical sheet can be more reliably sandwiched by the latching component inserted into the opening and the specific portion of the first optical sheet other than the latching component.

[7] In accordance with a preferred embodiment according to the display device in the fifth or sixth configuration, the at least one second optical sheet has a plurality of openings (seventh configuration).

With this configuration, because the latching component is inserted into the openings at a plurality positions, a plurality of the sandwiching structures are formed at the first optical sheet and the at least one second optical sheet so that the two can be brought into close contact with each other.

[8] In accordance with a preferred embodiment according to the display device in any one of the first to fourth configurations, a part of the at least one second optical sheet near an edge of the at least one second optical sheet is sandwiched between the latching component and the specific portion of the first optical sheet other than the latching component (eighth configuration).

With the eighth configuration, even if a portion that engages with the latching component (such as an opening in which the latching component is inserted) is not provided to the at least one second optical sheet, for example, the part of the at least one second optical sheet near the edge of the at least one second optical sheet can bend at the bent latching component and the specific portion of the first optical sheet other than the latching component. That is, even if the at least one second optical sheet is not processed, the sandwiching structure can be formed at the first optical sheet and the at least one second optical sheet and the two can be brought into close contact with each other.

[9] In accordance with a preferred embodiment according to the display device in the eighth configuration, the at least one second optical sheet has a planar size that is smaller than a planar size of the first optical sheet (ninth configuration).

With the ninth configuration, the first optical sheet and the at least one second optical sheet can be brought into close contact with each other by the above-mentioned sandwiching structure without the at least one second optical sheet protruding from above the first optical sheet.

[10] In accordance with a preferred embodiment according to the display device in any one of the first to ninth configurations described above, the at least one second optical sheet includes a plurality of second optical sheets (tenth configuration).

With the tenth configuration, the first optical sheet and the plurality of second optical sheets can be brought into close contact with each other by the sandwiching structure.

[11] In accordance with a preferred embodiment according to the display device in any one of the first to tenth configurations described above, the display device further comprises a diffusing plate configured to diffuse the light emitted from the light source. The at least one second optical sheet and the first optical sheet are disposed on the diffusing plate in this order. One end of the latching component abuts the diffusing plate to provide a gap between the diffusing plate and the at least one second optical sheet (eleventh configuration).

With the eleventh configuration, the gap is formed between the diffusing plate and the at least one second optical sheet. Thus, the radiation angle of the light diffused and radiated by the diffusing plate can be widened. Therefore, the contrast in the brightness distribution of the light radiated from the diffusing plate in plan view as seen from a direction perpendicular to the light radiating surface can be reduced, and this brightness distribution can be made more uniform. Thus, for example, it is possible to moderate or prevent the contrast according to the disposition of the light source that occurs in the brightness distribution, and shadows of members holding the diffusing plate, etc.

Furthermore, since the gap is formed between the diffusing plate and the at least one second optical sheet, the light reflected by the surface of the at least one second optical sheet can be recycled (reused). More specifically, the light reflected by the surface of the at least one second optical sheet can be reflected by the diffusing plate and directed again at the at least one second optical sheet. This recycling of the light raises the brightness of the light incident on the at least one second optical sheet, and improves the utilization efficiency of the light emitted from the light source.

[12] In accordance with a preferred embodiment according to the display device in any one of the first to eleventh configurations described above, the optical sheet further includes a third optical sheet at least partially contacting with the at least one second optical sheet. The at least one second optical sheet has an opening and a second latching component at different locations. The third optical sheet is sandwiched between the second latching component and a specific portion of the at least one second optical sheet other than the second latching component (twelfth configuration).

[13] In accordance with a preferred embodiment according to the display device in the twelfth configuration described above, the third optical sheet further has a second opening, and the second latching component is disposed through the second opening (thirteenth configuration).

[14] In accordance with a preferred embodiment according to the display device in any one of the first to eleventh configurations described above, the optical sheet further includes a fourth optical sheet at least partially contacting with the at least one second optical sheet. The fourth optical sheet has a third latching component. The at least one second optical sheet is sandwiched between the third latching component and a specific portion of the fourth optical sheet other than the third latching component (fourteenth configuration).

[15] In accordance with a preferred embodiment according to the display device in the fourteenth configuration described above, the at least one second optical sheet has an opening and a third opening at different locations, and the third latching component is disposed through the third opening (fifteenth configuration).

[16] In accordance with a preferred embodiment according to the display device in the first configuration described above, the latching component extends away from the display panel with respect to the specific portion of the first optical sheet other than the latching component (sixteenth configuration).

[17] In accordance with a preferred embodiment according to the display device in the first configuration described above, the latching component extends towards the display panel with respect to the specific portion of the first optical sheet other than the latching component (seventeenth configuration).

[18] In accordance with a preferred embodiment according to the display device in the second configuration described above, the latching component extends away from the edge of the first optical sheet (eighteenth configuration).

[19] In accordance with a preferred embodiment according to the display device in the second configuration described above, the latching component extends towards the edge of the first optical sheet (nineteenth configuration).

[20] In accordance with a preferred embodiment according to the display device in the first configuration described above, the first optical sheet is disposed between the display panel and the at least one second optical sheet (twentieth configuration).

With the present invention, it is possible to provide a display device with which the wrinkling of optical sheets is suppressed or prevented.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a display device in an upright position. Accordingly, these directional terms, as utilized to describe the display device should be interpreted relative to a display device in an upright position on a horizontal surface. The terms "left" and "right" are used to indicate the "right" when referencing from the right side as viewed from the front of the display device, and the "left" when referencing from the left side as viewed from the front of the display device.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:
a light source that emits light;
a display panel that displays image; and
an optical sheet laminate that transmits the light directed to the display panel;
a cabinet forming a housing of the display device, the cabinet having a front cabinet and a rear cabinet, the front cabinet and the rear cabinet being made from a resin material;
a frame holding the optical sheet laminate, the frame having a front frame and a rear frame; and
a reflective sheet attached to the rear frame,
the optical sheet laminate including a first optical sheet having an opening edge defining an opening near an edge of the first optical sheet, and at least one second optical sheet at least partially contacting with the first optical sheet and having an opening edge defining an opening near an edge of the at least one second optical sheet, the opening edge of the first optical sheet and the opening edge of the at least one second optical sheet overlapping with the reflective sheet as viewed from a front elevational view of the display device, respectively, the front frame and the rear frame being attached to the front cabinet with a screw at a location near a bottom edge of the display panel, and the rear cabinet covering the rear frame from a rear of the rear frame such that the rear frame does not expose rearward.

2. The display device according to claim 1, further comprising a diffusing plate that diffuses the light emitted from the light source, the at least one second optical sheet and the first optical sheet being disposed on the diffusing plate in this order.

3. The display device according to claim 1, further comprising a latching component inserted into the opening of the at least one second optical sheet.

4. The display device according to claim 3, wherein the opening of the at least one second optical sheet has a width that is less than a length of the latching component.

5. The display device according to claim 1, further comprising a latching component inserted into the opening of the first optical sheet.

6. The display device according to claim 3, wherein the opening of the at least one second optical sheet has a width that is less than a length of the latching component.

7. The display device according to claim 1, wherein the first optical sheet has a plurality of the openings on a plurality of the edges of the first optical sheet, and the at least one second optical sheet has a plurality of the openings on a plurality of the edges of the at least one second optical sheet.

8. The display device according to claim 1, wherein the front frame and the rear frame are attached to a rib of the front cabinet with the screw.

9. The display device according to claim 1, wherein the rear frame is attached to the rear cabinet with a screw.

10. The display device according to claim 1, wherein the front frame surrounds peripheral edges of the optical sheet laminate, and the rear frame houses the light source.

11. The display device according to claim 1, wherein the front cabinet covers the rear cabinet to surround side peripheral edges of the display panel.

12. The display device according to claim 1, wherein the front frame is made from a resin material.

13. The display device according to claim 1, wherein the rear frame is made from a metal material.

14. The display device according to claim 1, wherein the opening of the first optical sheet and the opening of the at least one second optical sheet are at least partially aligned with each other.

15. The display device according to claim 1, wherein the rear frame has an outer peripheral portion with a flat component that extends outward relative to a center of the display device and a bent part that extends rearward from an outer edge of the flat component, and the front frame and the front cabinet are fastened to the bent part of the rear frame with the screw.

16. The display device according to claim 15, wherein the front cabinet has a front part and an extending part that rearwardly extends from the front part, and the front frame has a side wall that is disposed between the bent part of the rear frame and the extending part of the front cabinet.

17. The display device according to claim 16, wherein the rear cabinet has a side wall, and the side wall of the front frame and the extending part of the front cabinet are disposed between the bent part of the rear frame and the side wall of the rear cabinet.

18. The display device according to claim 15, wherein the rear frame is attached to the rear cabinet with a screw at a location inward of the outer peripheral portion of the rear frame relative to the center of the display device.

* * * * *